United States Patent
Snyder et al.

(10) Patent No.: US 6,357,220 B1
(45) Date of Patent: Mar. 19, 2002

(54) GEARBOX ACCESSORY MOUNT

(75) Inventors: Ryan K. Snyder, Glastonbury; Alexander P. Girgenti, Coventry; Keven G. Van Duyn, Bloomfield; Peter C. Tiziani, Stafford Springs; Thomas B. Avis, Manchester; Antonio J. Portelinha, Oakville, all of CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 09/218,872

(22) Filed: Dec. 22, 1998

(51) Int. Cl.[7] .................................................. F02C 7/32
(52) U.S. Cl. ....................... 60/39.31; 60/223; 60/226.1
(58) Field of Search ............................. 60/39.31, 39.32, 60/39.33, 39.08, 226.1, 223; 244/54

(56) References Cited

U.S. PATENT DOCUMENTS

| | | | | |
|---|---|---|---|---|
| 2,803,943 A | * | 8/1957 | Rainbow | 60/39.31 |
| 2,978,869 A | * | 4/1961 | Hiscock et al. | 60/39.31 |
| 3,710,568 A | * | 1/1973 | Rice | 60/39.31 |
| 3,722,214 A | * | 3/1973 | Guillot | 60/39.31 |
| 3,830,058 A | * | 8/1974 | Ainsworth | 60/226.1 |
| 3,907,220 A | * | 9/1975 | Amelio | 60/39.31 |
| 5,174,110 A | * | 12/1992 | Duesler et al. | 60/226.1 |
| 5,303,896 A | * | 4/1994 | Sterka | 244/54 |
| 5,435,124 A | * | 7/1995 | Sadil et al. | 60/39.31 |

* cited by examiner

Primary Examiner—Ted Kim

(57) ABSTRACT

A mount for a gearbox accessory for a gas turbine engine substantially isolates the accessory from direct mechanical loading from the engine case during normal engine operating conditions and couples the accessory to the engine case during high rotor imbalance conditions to minimize interface loads between the gearbox and the accessory. By coupling the gearbox to the accessory, the two are displaced substantially in unison, thereby minimizing interface stresses therebetween. Various construction details of the mount for the gearbox accessories are disclosed.

4 Claims, 2 Drawing Sheets

GEARBOX ACCESSORY MOUNT

TECHNICAL FIELD

The present invention relates to gas turbine engines, and more particularly to providing a mounting support system for an accessory mounted to a gearbox of the engine which minimizes damage to the accessory and gearbox in the event of a severe rotor imbalance condition such as a fan blade loss.

BACKGROUND ART

Modern gas turbine aircraft engines have gearboxes that are mounted on their external cases. The main gearbox is generally positioned under the engine's core or fan case and uses power from the engine to drive the major accessories needed for engine functions such as generators for electricity, pumps for circulating fluids and heat exchangers for cooling oil or heating fuel. The accessories are frequently mounted on the gearbox.

The main gearbox of modern turbofan engines such as the Model PW4000, manufactured by the Pratt & Whitney Division of United Technologies Corporation, is mounted within the engine core cowl and is driven by an angle gearbox through a towershaft from the high-pressure compressor. The main gearbox drives the fuel pump, scavenge pump, the electrical generator for the electronic engine control, external deoiler, hydraulic pump, and the integrated drive generator (for aircraft electricity).

Various mounting arrangements are used to mount such accessories of the gearbox to the gearbox housing. The accessories, such as the fuel pump are often solidly connected to the gearbox by a series of bolts on a mounting flange at the face of the gearbox.

One problem caused by mounting the gearbox to the engine case is subjecting the gearbox and the associated mounted accessories to high loads caused by rotor imbalances. Severe rotor imbalance can occur in an engine, particularly after a fan blade breaks off from the rotor assembly. One cause of fan blade loss is impact with foreign objects, such as birds, hailstones or other objects which, on occasion, are ingested into the engine. The detached fan blade is thrown outwardly and passes through the fan case, but is typically caught by the fabric wraps in the fan containment case assembly. Blade loss produces an imbalance in the rotor and causes the rotor shaft to deflect radially outwardly. The more the rotor deflects, the greater is the radial load on the rotor bearing supports.

The rotor imbalance loads are transmitted from the bearing supports to the engine case and ultimately to the gearbox fastened to the engine case. The gearbox is forced to move with the engine as the gearbox is fastened to the engine case. In turn, loads are transmitted from the gearbox to the gearbox-mounted accessories. At the interface of the accessory and gearbox, the accessory, due to the relatively high mass thereof, reacts the loads applied to the interface, from the gearbox. Reaction, rather than transmission of such loads through the interface, results in high interface stresses, which may cause cracking at the interface. The cracking may propagate and cause the liberation of the accessories themselves from the gearbox due to the separation at the mounting interface of the gearbox housing and the accessory.

Moreover, if a fuel-handling accessory breaks off from the gearbox or pulls apart, spilled fuel may cause a fire. In particular, the fuel pump and fuel-metering unit mounted to the gearbox, if cracked, may liberate fuel causing such fire conditions. The cracking may initiate at the fuel pump mounting flange which could produce excessive deflections in the interface between the gearbox and the mounted fuel pump which in turn could fracture fuel lines and undesirably release fuel.

Consequently, gearbox housings and accessory mounts have been made thicker, the mounting points stronger, and other strength and durability requirements have been increased. However, these prior art solutions have resulted in substantially heavier hardware which in turn has resulted in the gearbox mount loads to increase. In turn, the efficiency of the engines is adversely impacted by such heavier hardware.

Thus, the challenge for modern gas turbine engines, during severe rotor imbalance events, is the limiting of damage to the accessory mounts, the gearbox and accessories themselves.

DISCLOSURE OF THE INVENTION

A primary object of the present invention is to provide a mounting arrangement for a gearbox accessory, that minimizes the interface stresses between the accessory and the gearbox experienced during a severe rotor imbalance event such as a fan blade loss condition.

According to the present invention, an apparatus for mounting a gearbox accessory for a gas turbine engine substantially isolates the accessory from direct mechanical loading from the engine case during normal engine operating conditions and couples the accessory to the engine case, during high rotor imbalance conditions to minimize interface loads between the gearbox and the accessory. By coupling the accessory to the engine case during a high rotor imbalance condition, the gearbox and the accessory are displaced (vibrate) substantially in unison, thereby minimizing interface loads (stresses) therebetween which would otherwise cause cracking at the interface if reacted by the mass of the accessory.

In the preferred embodiment, the apparatus includes a mounting plate having attachment points for links that extend to and are attached to brackets which are mounted to the engine case. The brackets accommodate bending and torsional deflections of the engine case and accessory and, thus isolating the accessory from the engine case during normal engine operations. The plate has a geometry and thickness sufficient to carry loads between the links and the accessory during a high rotor imbalance condition. A grommet and bushing are disposed at the interface between the links and the plate, which dampen the interaction of the links with the accessory during normal engine operation. During a severe rotor imbalance event, the grommet is compressed and collapses to provide the equivalent of a hard coupling between the accessory and the engine.

A primary advantage of the present invention is the minimization of damage to the accessories, and the gearbox housing during large rotor imbalance conditions, such as in the event of a fan blade loss. The mount for gearbox accessories of the present invention provides acceptable means for minimizing stresses at the interface of the gearbox and accessories. A further advantage of the present invention is its ability to provide an appropriate mounting structure for the gearbox-mounted accessory during both normal operating conditions and a high rotor imbalance event. Another advantage is the ease and cost of manufacturing and incorporating into the mounting arrangement of the prior art, the mount of the present invention. The simplicity of the structure of the mount and the use of economic and readily available materials, allows for cost effective manufacturing processes. The mount of the present invention does not require periodic maintenance and is, thus, cost effective to incorporate into prior art engines. The gearbox housing can be made lighter as the strength of the accessory mounted thereto and the gearbox housing does not have to be increased due to the present invention. As a result, the use of the accessory mount of the present invention is beneficial to the efficiency of the engine.

The foregoing and other objects, features and advantages of the present invention will become more apparent in the following detailed description of the best mode for carrying out the invention and from the accompanying drawings which illustrate an embodiment of the invention.

BEST MODE FOR CARRYING OUT THE INVENTION

Figure 1:
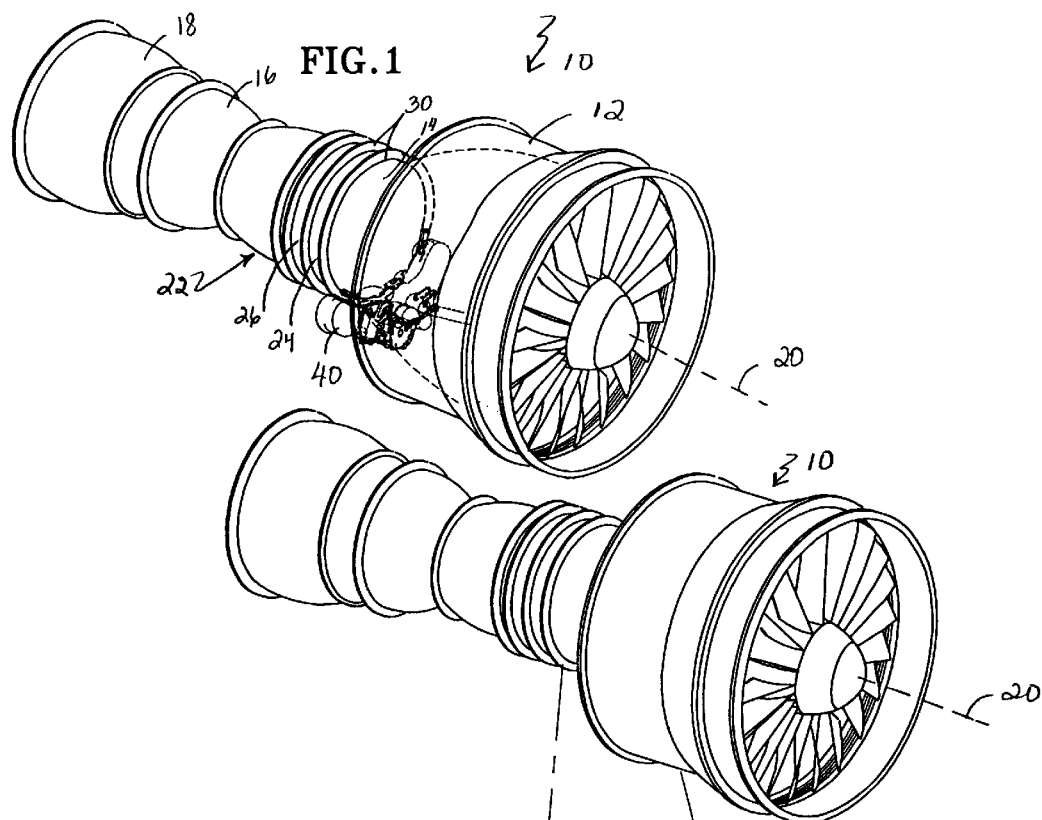
FIG. 1 is a perspective view of a typical axial flow, turbofan engine showing a gearbox in a mounted position on the engine's external case.

Referring to FIG. 1, a gas turbine engine 10 includes as its principal components a fan section 12, a compression section 14, a combustion section 16 and a turbine section 18. The compression and turbine sections each contain one or more stages of a compressor and turbine (not shown) which rotate about a central rotational axis 20. The principal components are circumscribed by an essentially cylindrical external case 22 which serves as a main structural support for the engine. The external case is usually constructed of individual case sections, such as case sections 24 and 26, which are joined together at bolted flanges such as flange 30. A gearbox 40 is mounted to the external case 22.

Figure 2:
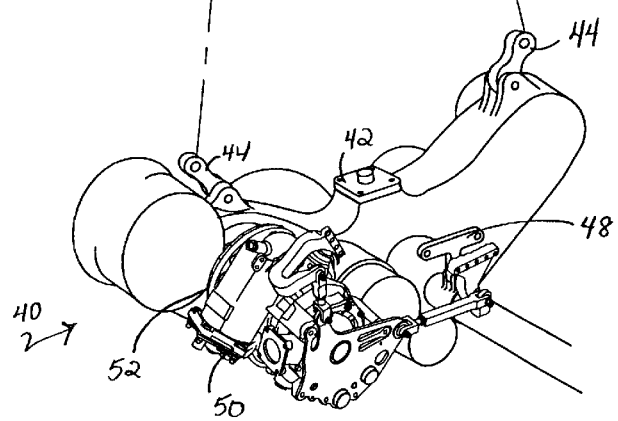
FIG. 2 is a perspective view of the gas turbine engine of FIG. 1 with an enlarged, exploded view of the gearbox and the mount of the present invention.

Referring to FIG. 2, the gearbox 40 is mounted to the external case by a locator 42 and side hanger links 44. The locator 42 maintains the alignment of the gearbox housing with the engine case. The plurality of hanger links 44 position and stabilize the gearbox with respect to the engine case. The gearbox is also attached to the engine by the T-shaped mount 48 axially forward of the locator 42 and hanger links 44. A gearbox-mounted accessory, such as the fuel pump 50 is mounted onto the gearbox using a series of bolts on a flange 52 at the face of the gearbox.

Figure 3:
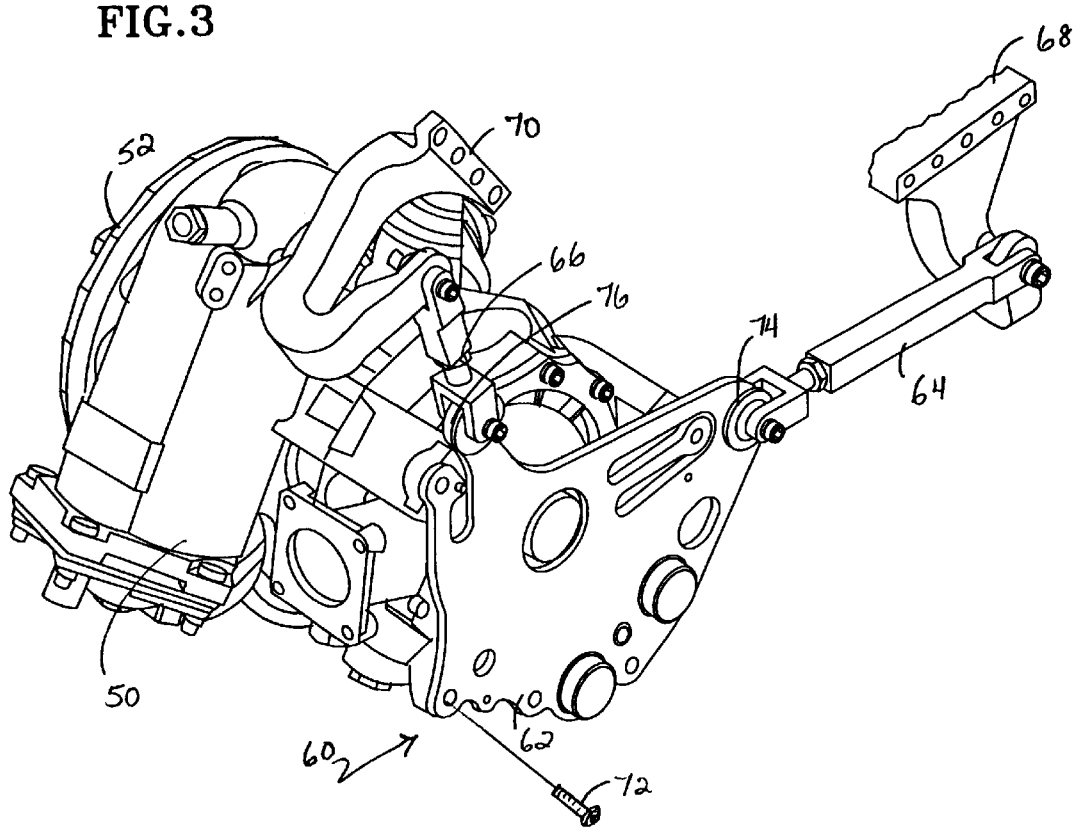
FIG. 3 is a perspective view showing the details of the mount of the present invention.
Figure 4:
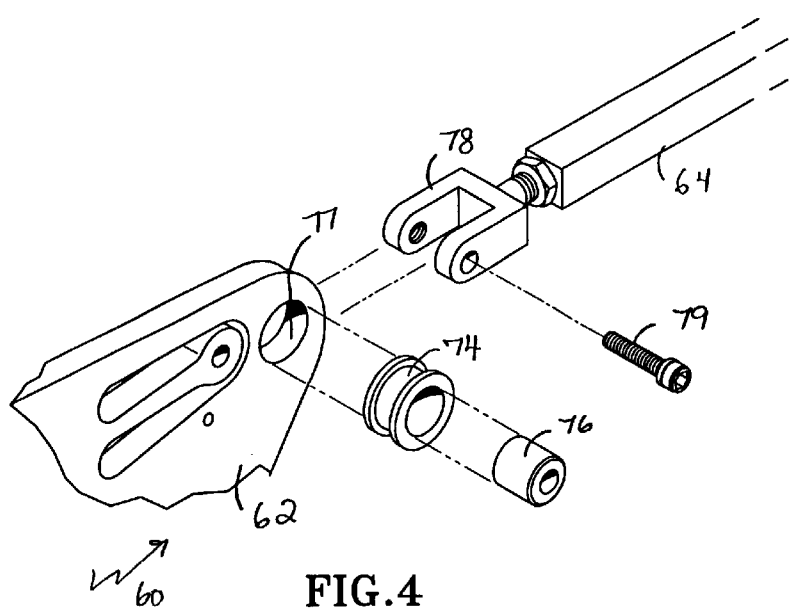
FIG. 4 is an exploded perspective view showing the connection between one of the links and plate of the mount of the present invention.

Referring to FIGS. 3 and 4, the mount 60 for the accessories mounted to the gearbox comprises of a mounting plate 62 having attachment points for a first link 64 and a second link 66. The first link 64 and second link 66 are generally orthogonal with respect to each other. The links extend and are attached to first and second brackets 68, 70 which are hard mounted to the engine case. For the Model PW4000, the mounting plate 62 is of about quarter inch (¼") or 0.006 meters thickness. The plate is formed from AMS 5525, revision G (steel) to provide maximum strength, while reducing the thermal expansion mismatch with the accessory it mates to, which is typically made of aluminum. The plate has a geometry and thickness sufficient to carry loads between the links and the accessory during a high rotor imbalance event. Further, the geometry of the plate provides uniform load distribution from the plate to the mating points with the accessories, in particular the fuel pump. The plate is mounted to the accessory with bolts 72 or studs.

The first link 64 and the second link 66 are made from AMS 5663, revision J (nickel-alloy) to provide sufficient strength to carry the loads associated with a high rotor imbalance condition. The links are adjustable using a threaded rod and hole as in a turn-buckle arrangement, to allow easy installation, to accommodate normal assembly and manufacturing tolerances.

Grommets 74 made from silicon rubber are received within bushings 76 made from AMS 5663, revision J (nickel-alloy) which are in turn received within apertures 77 in plate 62. A clevis 78 at the end of each link is pivotally attached to the plate at aperture 77 by means of bolt 79 received within bushing 76 and threaded into mating holes in the clevis. The grommets damp out vibrations between the accessory and the links during normal engine operation. Under severe rotor imbalance loads, the grommets are compressed and collapse to a condition of minimal resiliency, thus providing what is essentially a hard coupling between the accessory and the engine case. The grommets of the present invention are preferably made from an elastomer. It should be understood that non-elastomeric grommets may be used for high temperature applications.

The first bracket 68 attaches the mounting support system to the engine case at the high pressure compressor location and is made from AMS 5663, revision J (nickel-alloy). The second bracket 70 attaches the mounting support system to the engine case at the high pressure compressor location is made from AMS 6532, revision A (steel) to meet stiffness and load requirements.

During normal engine operation, inertia loads associated with engine displacement, originating from the engine bearing supports and fan case are transmitted through the gearbox-case mounts to the gearbox accessories such as the fuel pump. The gearbox accessory mount of the present invention substantially isolates the accessory from direct mechanical loading from the engine case during the normal engine operating conditions. The brackets of the present invention accommodate bending and torsional deflections of the engine case and accessory and, thus isolating the accessory from the engine case during normal engine operation. The grommets and bushings of the present invention dampen the interaction of the links with the accessory.

During a severe rotor imbalance condition, the mount 60 of the present invention couples the accessory 50 to the engine case 22 to minimize interface loads between the gearbox and the accessory. Severe engine case deflections are transmitted through the links and grommets 74 compress and collapse due to the application of such high deflection loads. The collapse of the grommets essentially provides a hard coupling between the gearbox and the engine case. By coupling the accessory to the engine case in such a manner, the accessory and the gearbox vibrate together. As a result, the mass of the accessory does not react (oppose) loading of the accessory through loads transmitted to the accessory through the gearbox. Therefore, interface stresses between the accessory and the gearbox are minimized and the interface is not compromised during a severe rotor imbalance event.

A primary advantage of the present invention gearbox accessory mount is the minimization of damage to the interface between the accessory and gearbox in the event of large rotor imbalances, such as a fan blade loss. A further advantage of the present invention is its ability to provide an appropriate mount for the gearbox-mounted accessory during both normal operation and a severe rotor imbalance event. Another advantage is the ease and cost of manufacturing and incorporating the mount of the present invention. The simplicity of the structure and the use of economical materials allows for cost effective manufacturing processes. Further, prior art gearboxes and accessories can be retrofitted to include the accessory mount in a cost-effective manner. By incorporating the present invention gearbox mounts, current engines limit damage to the gearbox-mounted accessories during severe rotor imbalance events.

Although the invention has been shown and described with respect to detailed embodiments thereof, it should be understood by those skilled in the art that various changes in form and detail thereof may be made without departing from the spirit and the scope of the claimed invention. As described hereinabove, the components of the mount of the present invention such as the brackets, links, grommets and bushings have been described as being formed from particular materials. It should be understood that any material of sufficient strength, stiffness and temperature capability can be substituted for the materials set forth hereinabove.

What is claimed is:

1. A gas turbine engine comprising:

an engine case;

a gearbox mounted on the engine case;

an accessory mounted on the gearbox; and a secondary mount for mounting said accessory to said engine case, and adapted to substantially isolate said accessory from direct mechanical loading from said engine case during normal engine operating conditions and couple said accessory to said engine case during high rotor imbalance conditions to minimize interface stresses between said gearbox and said accessory.

2. A gas turbine engine of claim 1, wherein the secondary mount further includes, a mounting plate attached to the accessory, at least one link having a first end and a second end, said link operatively connected at said first end to said mounting plate through an elastomeric member and operatively connected at said second end to said engine case, wherein said elastomeric member being adapted to yield during a high rotor imbalance condition to couple the accessory essentially directly to said engine case.

3. The gas turbine engine of claim 2, wherein the secondary mount further includes at least one bracket attached to the engine case, said link being connected to said engine case through said bracket, said bracket accommodating bending and torsional deflections of the engine case and accessory during normal engine operations.

4. A gas turbine engine comprising:

an engine case;

a gearbox mounted to said engine case;

first mounting means for mounting said gearbox to said engine case;

an accessory mounted on said gearbox;

second mounting means for mounting said accessory to said gearbox; and third mounting means for mounting said accessory to said engine case for substantially isolating said accessory from direct mechanical loading from said engine case during normal engine operating conditions and for coupling said accessory to said engine case during high rotor imbalance conditions to minimize interface stresses between said gearbox and said accessory.

* * * * *